United States Patent
Jang

(10) Patent No.: US 8,805,161 B2
(45) Date of Patent: Aug. 12, 2014

(54) IMAGE DISPLAY DEVICE AND RESERVATION RECORDING METHOD

(75) Inventor: Hae-Won Jang, Gumi (KR)

(73) Assignee: LG Electronics Inc., Seoul (KR)

( * ) Notice: Subject to any disclaimer, the term of this patent is extended or adjusted under 35 U.S.C. 154(b) by 914 days.

(21) Appl. No.: 12/438,893

(22) PCT Filed: Sep. 7, 2007

(86) PCT No.: PCT/KR2007/004327
§ 371 (c)(1),
(2), (4) Date: Feb. 25, 2009

(87) PCT Pub. No.: WO2008/032955
PCT Pub. Date: Mar. 20, 2008

(65) Prior Publication Data
US 2010/0014830 A1    Jan. 21, 2010

(30) Foreign Application Priority Data

Sep. 11, 2006  (KR) .................. 10-2006-0087525

(51) Int. Cl.
*H04N 5/76* (2006.01)
(52) U.S. Cl.
USPC ........................................ 386/238
(58) Field of Classification Search
USPC .......................................... 386/83
See application file for complete search history.

(56) References Cited

U.S. PATENT DOCUMENTS

| | | | |
|---|---|---|---|
| 6,865,746 B1 | 3/2005 | Herrington et al. | |
| 7,548,950 B2 * | 6/2009 | Numakami et al. | 709/204 |
| 2002/0174430 A1 | 11/2002 | Ellis et al. | |
| 2003/0046699 A1 * | 3/2003 | Nonomura et al. | 725/58 |
| 2003/0190150 A1 | 10/2003 | Kawasaki et al. | |
| 2003/0208763 A1 | 11/2003 | McElhatten et al. | |
| 2005/0251750 A1 | 11/2005 | Vallone et al. | |
| 2006/0029369 A1 | 2/2006 | Ohde et al. | |
| 2006/0136966 A1 | 6/2006 | Folk, II | |

FOREIGN PATENT DOCUMENTS

| | | |
|---|---|---|
| CN | 1440193 A | 9/2003 |
| CN | 1731851 A | 2/2006 |
| EP | 1355489 A2 | 10/2003 |
| JP | 2001-245244 A | 9/2001 |
| JP | 2006-115227 A | 4/2006 |
| KR | 2003-0022045 A | 3/2003 |
| KR | 10-2006-0040349 A | 5/2006 |
| KR | 2007-0107848 A | 11/2007 |

* cited by examiner

*Primary Examiner* — Hadi Armouche
*Assistant Examiner* — Dao Ho
(74) *Attorney, Agent, or Firm* — Birch, Stewart, Kolasch & Birch, LLP

(57) ABSTRACT

Provided are an image display device and a reservation recording method. According to the method, a user can conveniently set series reservation recording on a recording list on the basis of history data of a record material.

12 Claims, 6 Drawing Sheets

IMAGE DISPLAY DEVICE AND RESERVATION RECORDING METHOD

TECHNICAL FIELD

The present embodiments relate to a method for setting reservation recording for a series using history data of a material to be recorded.

BACKGROUND ART

Generally, a method for registering reservation recording in a personal video recorder (PVR) system can be roughly divided into two methods of a manual reservation and reservation using a electronic program guide (EPG).

In the manual reservation, a channel and a date of recording, a start time, an end time, and a recording length are manually input by a user. In the reservation using the EPG, a predetermined channel and program are selected to set reservation recording. Here, when the EPG is used, the user can set reservation recording in an intuitive manner.

DISCLOSURE OF INVENTION

Technical Problem

According to a related art image display device and reservation recording method, in the case where a user checks a material to record on a recording list and desires to perform reservation recording on a next episode of the checked material, which will be broadcasted, the reservation recording cannot be set when there is no EPG data regarding the next episode to be broadcasted and an exact broadcasting time is not known. Therefore, the related art image display device and reservation recording method needs to be improved to increase convenience of a user.

Technical Solution

In one embodiment, an image display device includes: a user interface unit for receiving a request command from a user; an input signal processing unit for receiving and processing a broadcasting signal including electronic program guide data from an outside; a storage unit for storing corresponding broadcasting data including the electronic program guide data according to a recording command input from the user interface unit; a record material data extracting unit for extracting history data of a record material to which series reservation recording has been set from the storage unit according to a series reservation recording command on a recording list, the series reservation recording command being input via the user interface unit; and a control unit for judging whether there exist electronic program guide data similar to the data extracted by the record material extracting unit, and controlling reservation recording setting of a corresponding program on the basis of series reservation recording conditions set in advance by the user.

The details of one or more embodiments are set forth in the accompanying drawings and the description below. Other features will be apparent from the description and drawings, and from the claims.

Advantageous Effects

According to the present embodiment, inconvenience that a user should manually set reservation recording through EPG data case by case is resolved, and a record material can be effectively managed in accordance with a series reservation recording condition set in advance.

MODE FOR THE INVENTION

Reference will now be made in detail to the embodiments of the present disclosure, examples of which are illustrated in the accompanying drawings.

Figure 1:
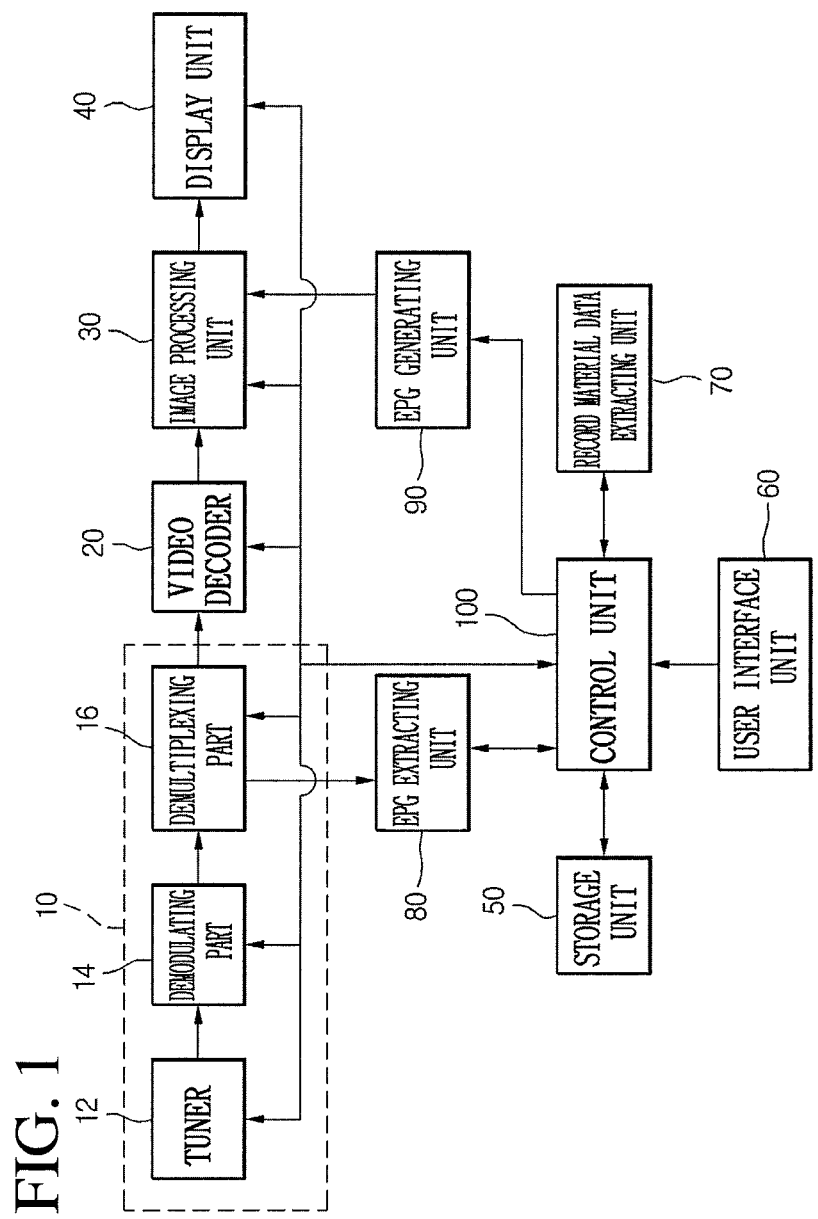
FIG. 1 is a block diagram explaining an image display device according to a proposed embodiment.

Referring to FIG. 1, an image display device according to a proposed embodiment includes: an input signal processing unit 10 for receiving and processing broadcasting signals including EPG data from an outside; a video decoder 20 for receiving and decoding image signals processed by the input signal processing unit 10; an image processing unit 30 for receiving the image signals decoded by the video decoder 20 to change brightness and color signals of the image signals so that the image signals are displayable on a screen; a display unit 40 for displaying image signals processed by the image processing unit 30; a storage unit 50 for storing broadcasting signals including EPG data; a user interface unit 60 for receiving a request command from a user; a record material data extracting unit 70 for extracting history data of a record material to which a series reservation recording has been set by the user from the storage unit 50 when a series reservation recording command is input through the user interface unit 60 on a recording list; an EPG extracting unit 80 for extracting EPG data of broadcasting signals received through the input signal processing unit 10; an EPG generating unit 90 for updating EPG data stored in advance using the EPG data extracted by the EPG extracting unit 80, and generating an EPG data screen on the basis of the updated EPG data; and a control unit 100 for judging whether there exists a broadcasting program of a similar title to the data extracted by the record material data extracting unit 70 and the EPG data generated by the EPG generating unit 90, and controlling reservation recording setting of a corresponding program according to a series reservation recording condition set in advance by the user.

The input signal processing unit 10 includes a tuner 12 for selecting broadcasting signals of a channel desired by the user from broadcasting signals including EPG data received from the outside, a demodulating part for demodulating broadcasting signals selected by the tuner 12 to correct an error, and converting the broadcasting signals into transport streams (TS), and a demultiplexing part 16 for demultiplexing TS multiplexed in time and input through the demodulating part 14 to separate the TS into audio, video, and additional data streams.

The operation of an image display device having the above-described construction will be described below.

First, when a power-on command is input through the user interface unit 60, the control unit 100 outputs a control signal so that broadcasting signals of a channel desired by a user are selected by the tuner 12.

The tuner 12 selects broadcasting signals of the channel desired by the user from broadcasting signals received from the outside. The demodulating part 14 demodulates the broadcasting signals selected by the tuner 12 to correct errors, converts the signals into TS. The demultiplexing part 16 demultiplexes TS multiplexed in time and input through the demodulating part 14 to separate the TS into audio, video, and additional data streams.

Video streams separated by the demultiplexing part 16 are decoded by the video decoder 20. Video signals decoded by the video decoder 20 are converted into brightness and color signals so that they are displayable on a screen through the image processing unit 30, and displayed on the display unit 40.

Also, broadcasting signals of broadcasting signals processed by the input signal processing unit 10, for which a recording command is input from the user interface unit 60 pass through a predetermined signal processing and are stored in the storage unit 50 in response to a control signal of the control unit 100.

At this point, in the case where the user records digital broadcasting desired by himself, the storage unit 50 generates history data of a record material, that is, a program title, a recording time, channel data, and broadcasting station data as a database (DB) together with the record material, and manages the DB.

Also, when the user desires to view a list of record materials stored in the storage unit 50, the control unit 100 controls a recording list to be displayed through the display unit 40.

The user selects a desired record material from the recording list displayed through the display unit 40 to set recording, deleting, and series recording operations of the record material. Here, the series recording means when reservation recording is set once for a program broadcasted continuously at predetermined times on predetermined dates, reservation recording of the program can be continuously set.

Figure 2:
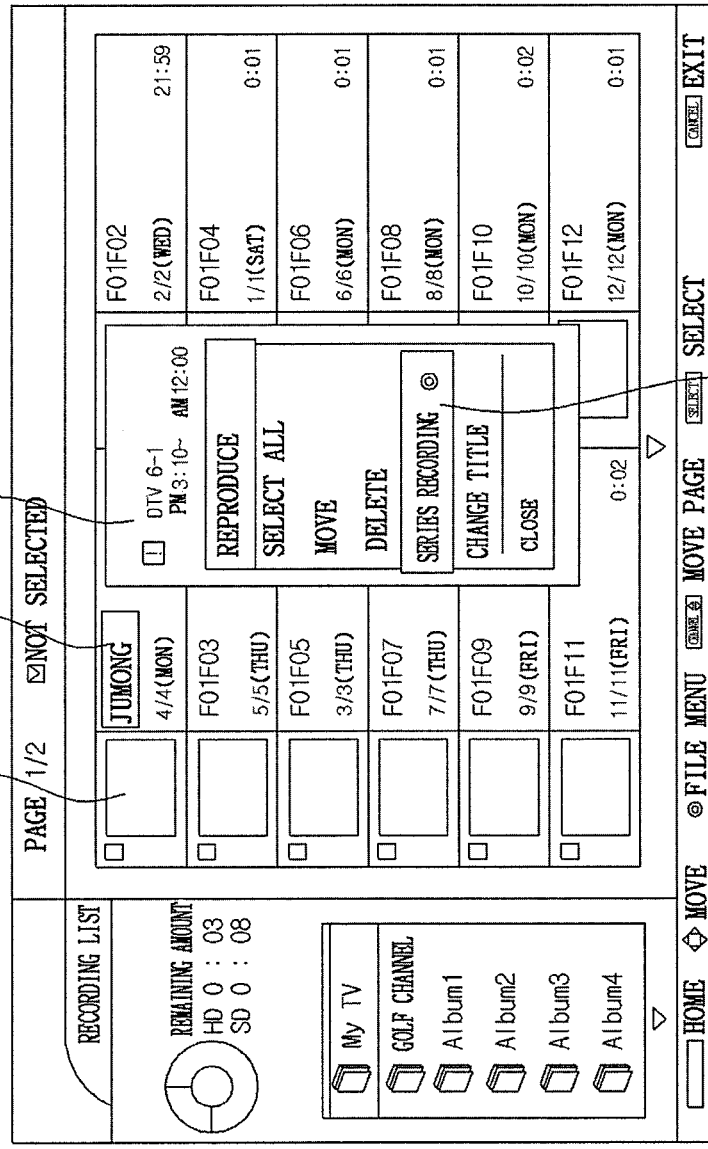
FIG. 2 is a recording list according to a proposed embodiment.

That is, referring to FIG. 2, a recording list is displayed on the display unit 40. Also, data of a record material including a title 210, data of recorded program 220, and a thumbnail of a record material 230 selected by the user are displayed on the recording list. Here, the user can select a desired menu form reproduction, select all, move, delete, series recording 240, and change title of a record material selected by the user through the user interface unit 60 to perform a corresponding operation.

The series recording 240 is a function of automatically setting reservation recording of a series program related to a record material to be broadcasted in the future using history data of the record material selected by the user. Here, the series recording may be set to only a series record material, but can be set to a general record material without limitation.

Figure 3:
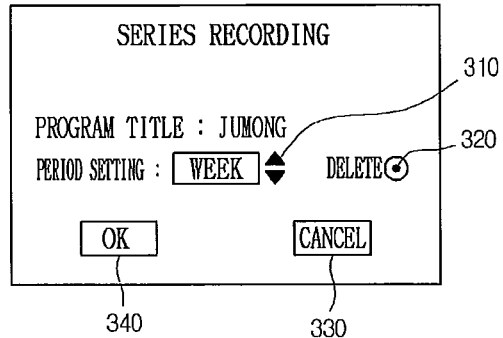
FIGS. 3 and 4 are views explaining a series reservation recording condition according to a proposed embodiment.
Figure 4:
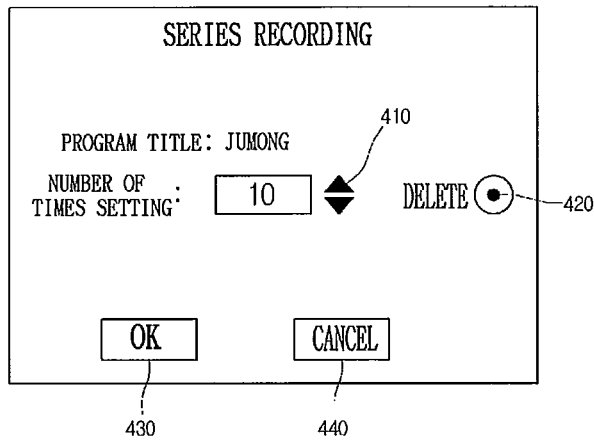

Also, when the user sets series recording to a program on the recording list, conditions of the program to which the series recording has been set by the user are set as illustrated in FIGS. 3 and 4. The series recording conditions include a series reservation recording period and the number of times of reservation recording. The series reservation recording period is a condition intended for canceling the series recording when EPG data similar to history data of the record material to which the series recording has been set by the user does not exist continuously.

That is, referring to FIG. 3, the user can set a desired period by selecting period setting 310, delete 320, conform 330, and cancel 340. Also, the period can be set to one week, one month, and so on. Regarding the delete 320, the series reservation recording period is not set and setting of the series reservation recording period can be maintained until EPG data of a similar title is received.

Also, the number of times of reservation recordings for a program to which series reservation recording has been set by the user can be set. The number of times of reservation recordings can be set to one time, ten times, and an arbitrary number of times designated by the user in person.

That is, referring to FIG. 4, the user sets the number of times of the series reservation recordings by selecting the number of times setting 410, delete 420, conform 430, and cancel 440. The control unit 100 controls the series reservation recording of the program to be performed by the set number of times of the series reservation recordings.

Subsequently, when the user sets series recording on the recording list, the control unit 100 outputs a control signal to the record material data extracting unit 70 to extract history data of a record material to which the series recording has been set by the user. The record material data extracting unit 70 extracts data of the record material to which the series recording has been set by the user in response to the control signal from the control unit 100.

The control unit 100 compares the data of the record material extracted by the record material data extracting unit 70 with EPG data generated by the EPG generating unit 90. That is, the control unit 100 judges whether there exists a broadcasting program similar to a title of the record material to which the series recording has been set by the user.

When there exists the broadcasting program similar to the title of the record material, the control unit 100 checks the number of times of reservation recordings of the program to which the series recording has been set by the user. When the number of times of the checked reservation recordings is zero, the control unit 100 cancels reservation recording setting of the program. When the number of times of the checked reservation recordings is not zero, the control unit 100 reduces the number of times of the reservation recordings by one and then registers the program on the reservation recording list.

Figure 5:
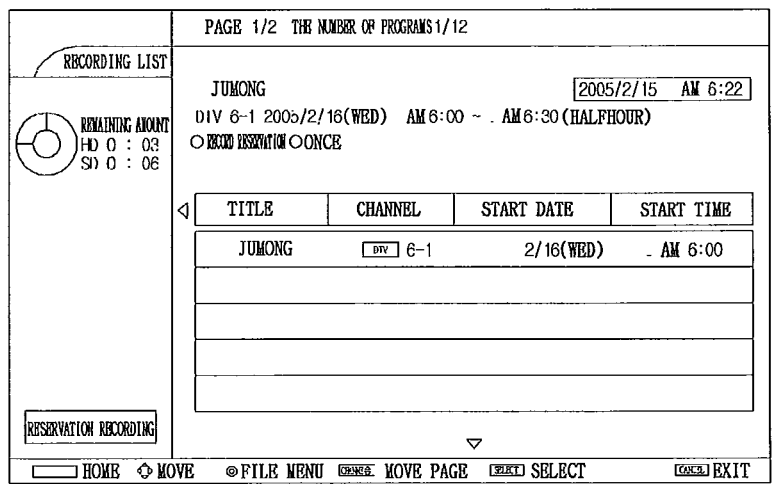
FIG. 5 is a view of a reservation recording list according to a proposed embodiment.

That is, referring to FIG. 5, when a broadcasting program having a title similar to that of a record material to which series recording has been set by the user exists in currently received EPG data, the control unit 100 registers the program on the reservation recording list.

Also, when a broadcasting program having a title similar to that of a record material to which series recording has been set by the user does not exist in currently received EPG data, the control unit 100 receives EPG data through the input signal processing unit 10, and judges whether there exists a broadcasting program having a title similar to that of a record material whenever the EPG data is periodically updated by the EPG generating unit 90 to set reservation recording of the program.

That is, when series recording is set, the control unit 100 searches for EPG data generated by the EPG generating unit 90 every predetermined period to judge whether there exists a program similar to a record material to which series recording has been set by the user. When there exists the program similar to the recording material, the control unit 100 sets reservation recording of the program.

Also, when there does not exist EPG data having a title similar to that of the record material to which the series recording has been set during the series reservation recoding period set by the user, the control unit 100 automatically cancels the set series recording.

Also, in the case where the program for which the reservation recording has been registered is rearranged due to the circumstances of a corresponding broadcasting company and the EPG data changes, the control unit 100 resets reservation recording of the program. That is, the control unit 100 reregisters reservation recording of the program to which the series recoding has been set by the user on the basis of new EPG data.

Also, when a broadcasting time of the program to which the reservation recording has been set arrives, the control unit 100 controls recording of the program. That is, the control unit 100 controls the program that is being recorded to be stored in a region of the storage unit 50 where related series materials have been stored. The program may be arranged so that the user can easily manage the series materials.

Also, when the user sets series reservation recording and there exists a newly recorded material, the control unit 100 controls a recording list to be displayed through the display unit 40 every predetermined period so that the user can recognize whether there exists the newly recorded material. The user can recognize whether there exists the newly recorded material through the displayed recording list, and can select whether to reproduce the recorded material.

Here, the recording list is displayed for each recording type of record materials. The recording type includes general reservation recording and series reservation recording. That is, a predetermined mark (special character) set in advance is made depending on whether the newly recorded material is a material recorded through the series reservation recording or the general reservation recording, so that it can be differently displayed. The recording list may be displayed through a sub-screen of the display unit 40 so that viewing of a current broadcasting program is not hindered.

In an image display device according to the above-proposed embodiment, when the user sets series recording on the recording list, reservation recording can be set on the basis of series reservation recording condition set by the user. When the program to which the reservation recording has been set is recorded, the program is stored in regions assigned for respective series materials. Accordingly, the user can easily manage the recorded program for each series material. Also, since the recording list is display at any time depending on whether a newly recorded material exists, the user can recognize whether the newly recorded material exists.

A reservation recording method according to the above-embodiment will be described below.

Figure 6:
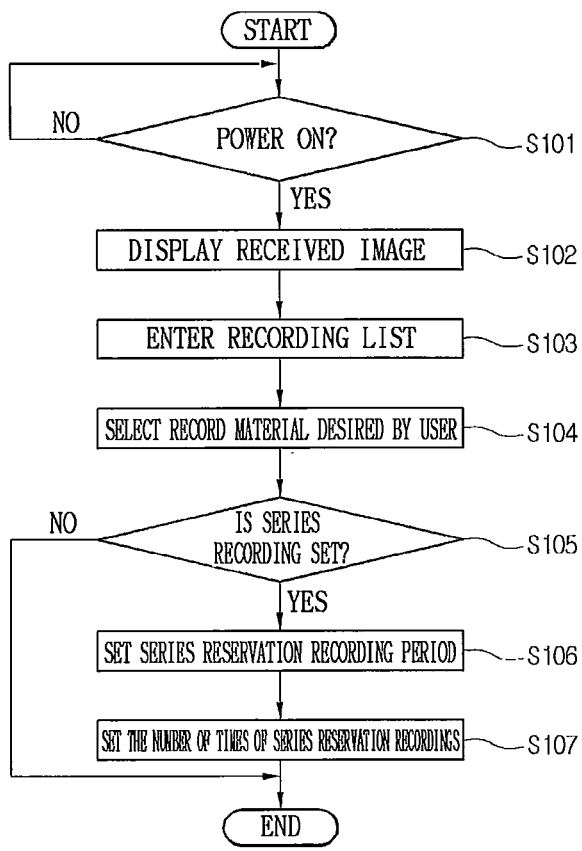
FIGS. 6 to 9 are flowcharts explaining a reservation recording method according to a proposed embodiment.

In the reservation method according to the embodiment, when a power-on command is input, a received image is displayed (S101-S102) as illustrated in FIG. 6.

Subsequently, the recording list is displayed according to a recording list entry command input from the user (S103).

Also, a record material desired by the user is selected from the recording list (S104).

Next, whether a series recording setting command for the record material selected by the user has been input is judged (S105).

Also, when the series recording setting command is input as a result of the judgment (S105), conditions of the series reservation recording are set (S106-S107).

That is, the conditions of the series reservation recording include a series reservation recording period and the number of times of reservation recordings. A menu screen for setting the series reservation recording period is displayed on the first place. Accordingly, the series reservation recording period for the selected record material is set (S106). Next, a menu screen for setting the number of times of reservation recordings is displayed, so that the number of times of reservation recordings for the program (the record material) to which the series reservation recording has been set is set (S107).

Figure 7:
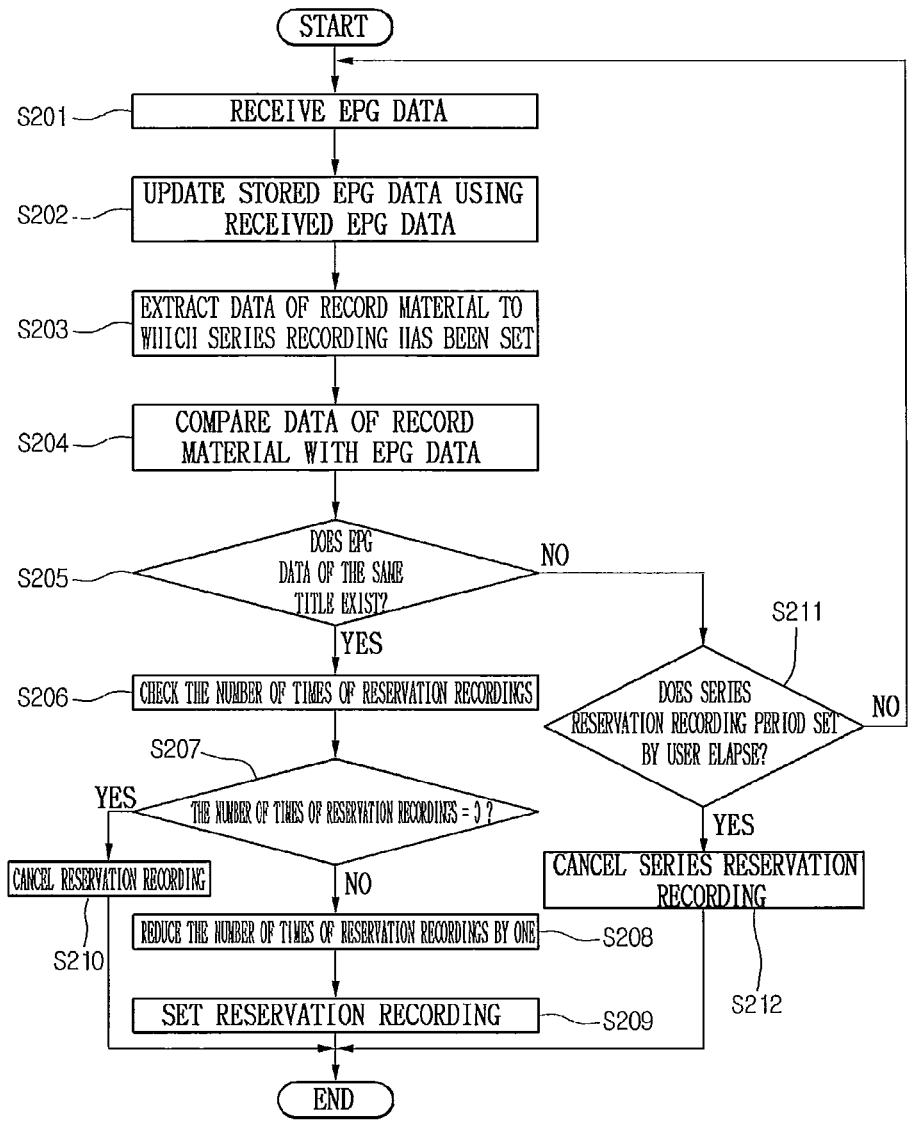

Also, according to the reservation recording method of the above-set program, EPG data are received from the outside (S201) as illustrated in FIG. 7.

EPG data stored in the storage unit 50 in advance are updated using the received EPG data (S202).

Subsequently, data of a record material to which series reservation recording has been set by the user are extracted (S203).

Also, the updated EPG data are compared with the data of the record material to which series reservation recording has been set (S204).

Subsequently, whether there exist EPG data similar to the data of the record material is judged (S205) as a result of the comparison (S205). Here, the comparing may be made by performing comparison using a program title of program data.

Also, when there exist similar EPG data as a result of the judgment (S205), the number of times of the above-set series reservation recordings is checked, and whether the number of times of the series reservation recordings is zero is judged (S206-S207).

Subsequently, when the number of times of the series reservation recordings is not zero as a result of the checking (S207), the number of times of the series reservation recordings is reduced by one, and reservation recording is set (S208-S209).

Also, when the number of times of the series reservation recordings is zero as a result of the checking (S207), the number of times of the series reservation recordings is canceled (S210).

Meanwhile, when there does not exist the similar EPG data as a result of the judgment (S205), whether the series reservation recording period set by the user has elapsed is judged (S211).

Subsequently, when the series reservation recording period has elapsed as a result of the judgment (S211), the series reservation recording is cancelled, and otherwise, an operation of S201 is performed.

Figure 8:
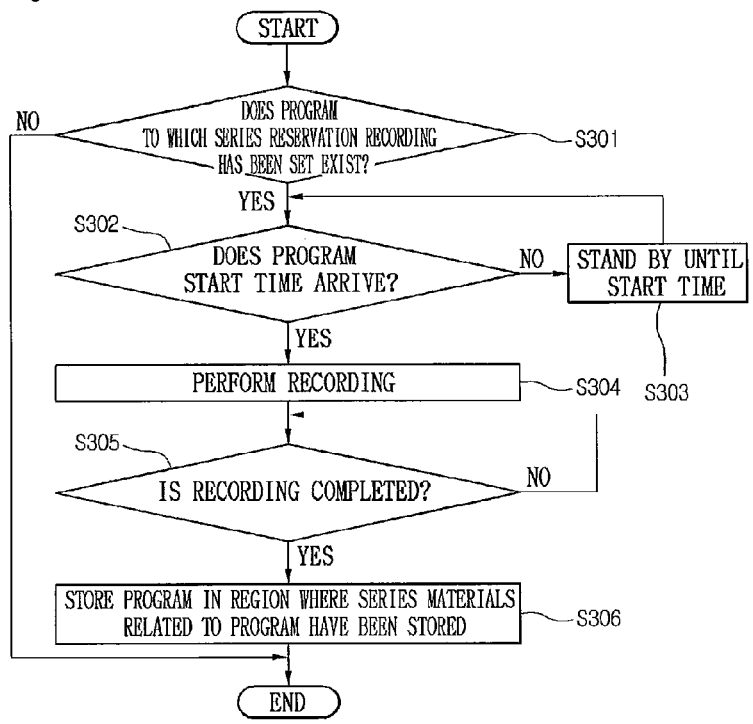

Also, according to a method for recording a program to which the reservation recording has been set, whether there exist a program to which series reservation recording has been set is judged on the first place as illustrated in FIG. 8 (S301).

When there exist the program to which the series reservation recording has been set as a result of the judgment (S301), whether a broadcasting start time of the program arrives is judged (S302).

Subsequently, when the broadcasting start time of the program does not arrive as a result of the judgment (S302), a recording operation stands by until the broadcasting start time of the program (S303). When the broadcasting start time of the program arrives as a result of the judgment (S302), a recording operation is performed (S304).

Also, when the recording of the program is completed, the program is stored in a region of the storage unit 50 where series materials of the program have been stored (S306). That is, respective storage regions are assigned for respective series materials to allow the user to easily manage recorded materials for respective series materials.

Figure 9:
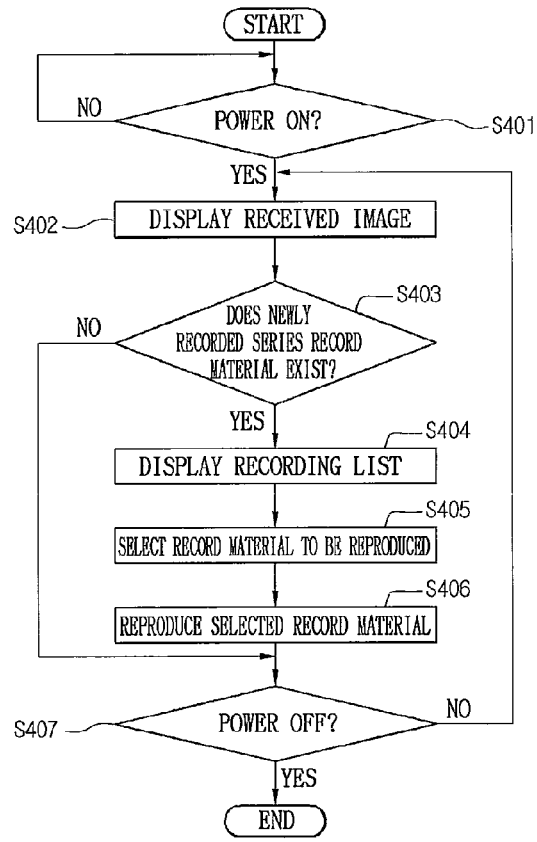

Also, according to a method for managing a record material on which recording has been completed, when a power-on command is input, a received image is displayed as illustrated in FIG. 9 (S401-S402).

After that, whether there exists a newly recorded material is judged (S403).

Subsequently, when there exists the newly recorded material as a result of the judgment (S403), a recording list on which recorded materials have been classified according to respective recording types is displayed (S404). That is, a predetermined mark is made on the recorded materials depending on whether the recording types of the recorded materials are general reservation recording or series reservation recording, and displayed.

Also, a recorded material to be reproduced is selected from the recording list (S405).

Subsequently, the selected recorded material is reproduced (S406).

When a power-off command is input, the operation is ended, and otherwise, the operation of S402 is performed (S407).

INDUSTRIAL APPLICABILITY

According to the proposed embodiment, the user can conveniently set series reservation recording on a recording list.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An image display device comprising:
a user interface unit configured to receive user commands;
an input signal processing unit configured to process broadcasting programs and electronic program guide (EPG) data received from an external source;
a display screen configured to display the broadcasting programs and the EPG data according to the user commands;
a storage unit configured to record therein a first broadcasting program from the broadcasting programs according to a first recording reservation request, when a broadcasting time of the first broadcasting program to which the first recording reservation request has been made arrives,
the storage unit further configured to store therein program data of the recorded first broadcasting program, and a list of recording materials identifying at least the recorded first broadcasting program; and
a control unit operatively coupled to the display screen and the storage unit, and further configured to:
display, on the display screen, the list of recording materials stored in the storage unit,
process a user's selection of the recorded first broadcasting program from the displayed list of recording materials, as a second recording reservation request associated with the recorded first broadcasting program,
judge whether or not the existing EPG data or new EPG data contains future program data that is the same as or similar to the program data of the recorded first broadcasting program, in response to the second recording reservation request, and
set a reservation recording of at least one second broadcasting program having the future program data based on the judging result, wherein the at least one second broadcasting program is at least one program related to the recorded first broadcasting program, and
wherein the control unit further displays, on the display screen, a list for the at least one second broadcasting program, when the second recording reservation request for the at least one second broadcasting program is set and the at least one second broadcasting program is stored in the storage unit.

2. The image display device according to claim 1, further comprising:
an electronic program guide (EPG) extracting unit configured to extract the EPG data from the broadcasting programs received through the input signal processing unit; and
an electronic program guide (EPG) generating unit configured to update electronic program guide data stored in advance on the basis of the EPG data extracted by the electronic program guide extracting unit, and to generate an electronic program guide data screen on the basis of the updated electronic program guide data.

3. The image display device according to claim 1, wherein the program data of the recorded first broadcasting program which is compared with the future program data includes a title of the recorded first broadcasting program.

4. A reservation recording method using an image display device, the image display device including an input signal processing unit, a storage unit, a display screen, and a control unit, the method comprising:
processing, by the input signal processing unit, broadcasting programs and electronic program guide (EPG) data received from an external source;
displaying, on the display screen, the broadcasting programs and the EPG data according to user commands;
recording, in the storage unit, a first broadcasting program from the broadcasting programs according to a first recording reservation request, when a broadcasting time of the first broadcasting program to which the first recording reservation request has been made arrives;
storing, in the storage unit, program data of the recorded first broadcasting program, and a list of recording materials identifying at least the recorded first broadcasting program;
displaying, on the display screen, the list of recording materials stored in the storage unit;
processing, by the control unit, a user's selection of the recorded first broadcasting program from the displayed list of recording materials, as a second recording reservation request associated with the recorded first broadcasting program;
judging whether or not the existing EPG data or new EPG data contains future program data that is the same as or similar to the program data of the recorded first broadcasting program, in response to the second recording reservation request;
setting a reservation recording of at least one second broadcasting program having the future program data based on the judging result,
wherein the at least one second broadcasting program is at least one program related to the recorded first broadcasting program; and
displaying, on the display screen, a list for the at least one second broadcasting program, when the second recording reservation request for the at least one second broadcasting program is set and the at least one second broadcasting program is stored in the storage unit.

5. The reservation recording method according to claim 4, wherein the program data of the recorded first broadcasting program which is compared with the future program data includes a title of the recorded first broadcasting program.

6. The reservation recording method according to claim 4, further comprising:
   recording, in the storage unit, the at least one second broadcasting program when the second recording reservation request for the at least one second broadcasting program is set and a broadcasting time of the at least one second broadcasting program arrives.

7. The image display device according to claim 1, wherein the at least one second broadcasting program and the recorded first broadcasting program are part of a program series.

8. The image display device according to claim 1, wherein the control unit is further configured to:
   display, on the display screen, at least one menu for setting recording reservation conditions for the second recording reservation request.

9. The image display device according to claim 8, wherein the recording reservation conditions set a reservation recording period and a number of times of reservation recording.

10. The reservation recording method according to claim 4, wherein the at least one second broadcasting program and the recorded first broadcasting program are part of a program series.

11. The reservation recording method according to claim 4, further comprising:
    displaying, on the display screen, at least one menu for setting recording reservation conditions for the second recording reservation request.

12. The reservation recording method according to claim 11, wherein the recording reservation conditions set a reservation recording period and a number of times of reservation recording.

* * * * *